Jan. 16, 1968     J. T. HICKS     3,363,494
CUTTING APPARATUS

Filed May 12, 1967     3 Sheets-Sheet 1

INVENTOR.
J.T. HICKS

BY *Young & Quigg*

ATTORNEYS

United States Patent Office 3,363,494
Patented Jan. 16, 1968

3,363,494
CUTTING APPARATUS
Joel T. Hicks, Bartlesville, Okla., assignor to Phillips Petroleum Company, a corporation of Delaware
Filed May 12, 1967, Ser. No. 637,962
6 Claims. (Cl. 82—75)

ABSTRACT OF THE DISCLOSURE

An apparatus for cutting elongated articles having a first outer annular shaft rotatably mounted and driven by a first drive means, a cutting means slidably mounted at one end of the first shaft for reciprocal movement with respect to the axis of said shaft a second annular shaft rotatably mounted within the first shaft driven by a second drive means, and a rigid connecting link connecting the second shaft and the cutting means. The article to be cut is transported through the annulus of the second shaft, both shafts rotating; relative rotation between the two shafts activates the cutting means.

This invention relates to a rotary cutting apparatus. In another aspect this invention relates to an apparatus for cross cutting elongated articles.

In many instances, it is desirable to cut an elongated work piece while the piece is moving on a production line. This allows a continuous operation without intermittent motion. In the production of certain types of articles, such as extruded thermoplastic pipe and tubing, it is advantageous to operate in such a continuous manner. Also, in cutting articles such as plastic tubing, it is advantageous to make a circular cut about the periphery rather than a vertical cut perpendicular to the axis of the tubing, which may cause the tubing to collapse.

According to the invention, there is provided a cutting apparatus comprising a first outer annular shaft rotatably mounted on a frame and having a first drive means, a cutting means slidably mounted for reciprocal motion relative to the axis of the shaft at one end of the first shaft, a second inner annular shaft rotatably mounted within the first shaft and having a second drive means and a rigid connecting link pivotally attached connecting the second shaft to the cutting means. The second annular shaft has an inner diameter of sufficient dimensions to receive the elongated article which is to be cut. As the article passes through the annulus of the second shaft, relative rotation between the two shafts causes the connecting link to slide the cutting means into contact with he article. Both shafts rotate and carry the cutting means around the periphery of the article to score or cut through the article, denpending upon the depth to which the cut is limited.

Further in accordance with the invention, there is provided means for controlling the amount of angular displacement between the two shafts, thus controlling the distance to which the cutting moves in toward the axis of the shafts so that the depth of the cut is controlled.

Accordingly, it is an object of this invention to cut elongated articles while the article is moving.

Another object of this invention is to provide an improved rotary cutting apparatus for use in a continuous operation.

Another object of this invention is to provide an apparatus capable of being adjusted to cross cut articles of various thicknesses.

Other objects and advantages of this invention will be apparent to one skilled in the art upon consideration of the specification, drawing, and appended claims.

Figure 1:
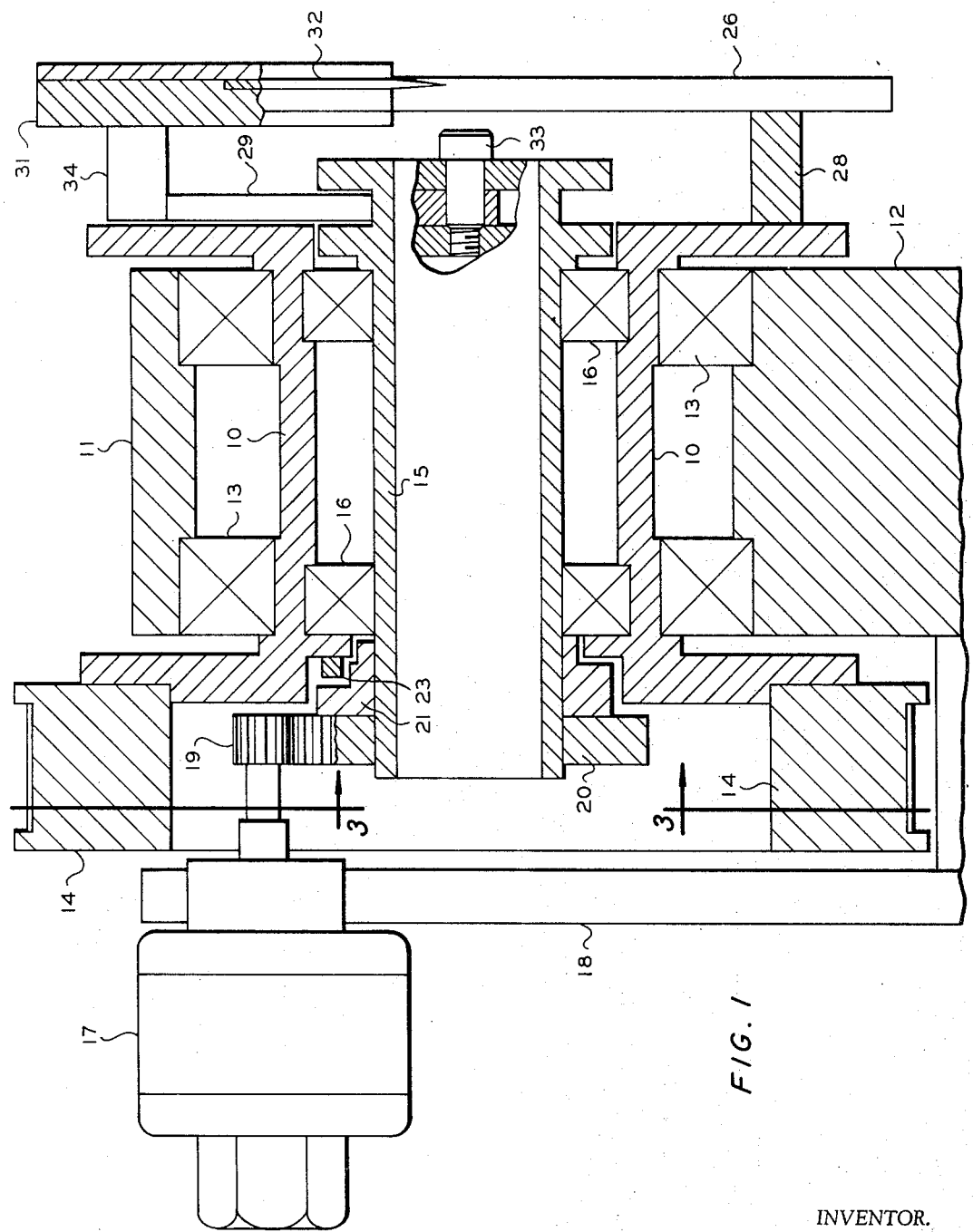
FIGURE 1 is a partially broken schematic cross-section and side elevation of the elements of the apparatus of the invention.
Figure 2:
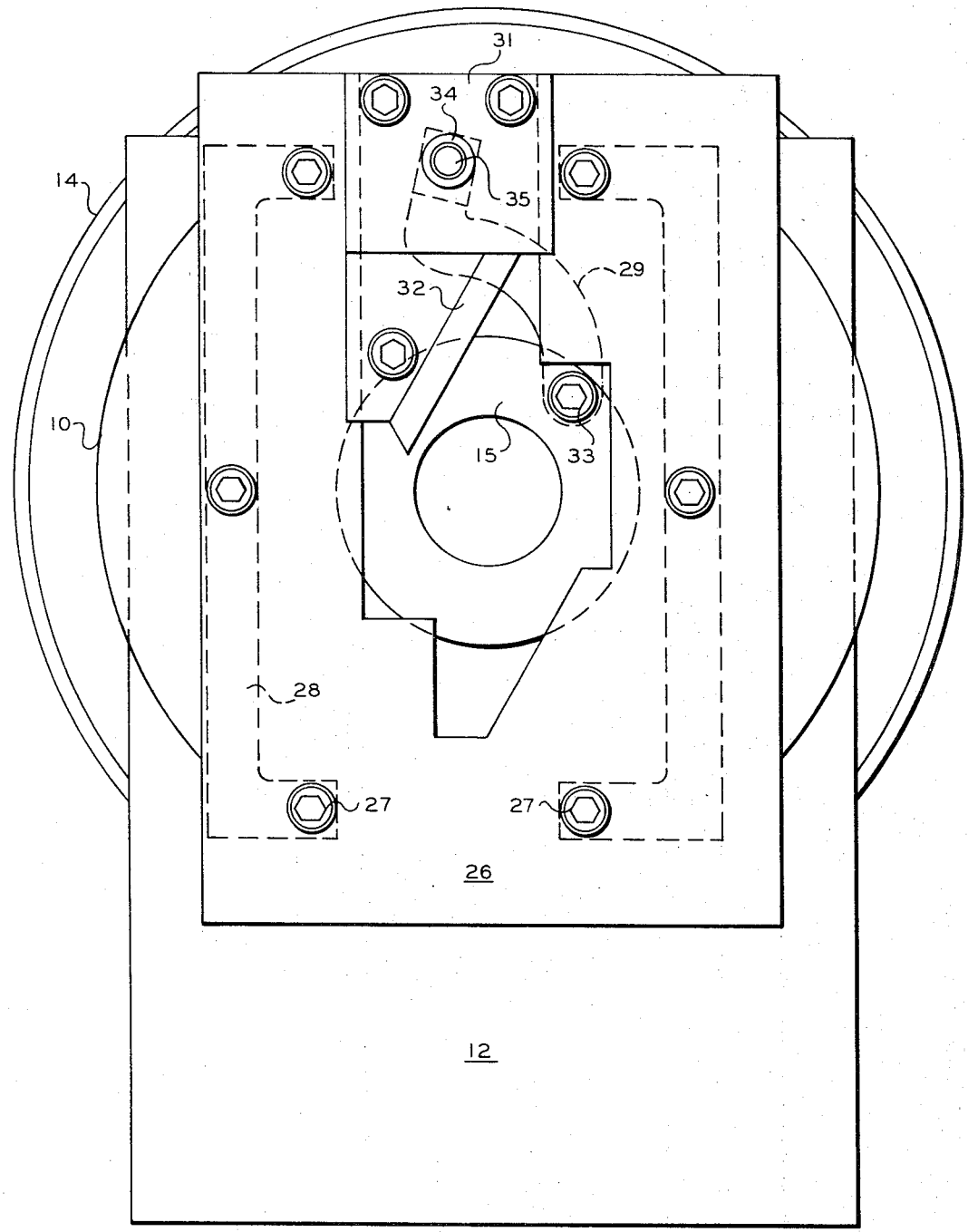
FIGURE 2 is a front elevation of the apparatus illustrated in FIGURE 1.

Referring now to the drawings wherein like reference numerals denote like elements in the different figures, the apparatus of the invention is described in more detail. As shown in FIGURES 1 and 2, a first outer annular shaft 10 is mounted within a housing 11 and supported on a frame 12. Shaft 10 is mounted on bearings 13 and is provided with a drive pulley 14 at one end. Pulley 14 can be belt driven by a suitable motor, not shown. The motor can be the constant-speed type but variable-speed motors are preferred so that the speed at which the cutting means travels about the periphery of the article can be varied.

A second annular shaft 15 is mounted within shaft 10 on bearings 16. Shaft 15 has inner dimensions allowing the passage of an elongated article through its annulus. Shaft 15 is driven by motor 17 through meshing gears 19 and 20. Motor 17 is mounted on a support arm 18 and is eccentrically positioned with respect to shaft 15 so that the annulus of shaft 15 is not obstructed. Motor 17 can be electric motor, an air motor, or other suitable type. In this embodiment an air motor equipped to receive air at differing pressures is utilized so that the speed of rotation of shaft 15 can be easily varied to actuate the cutting means.

Figure 3:
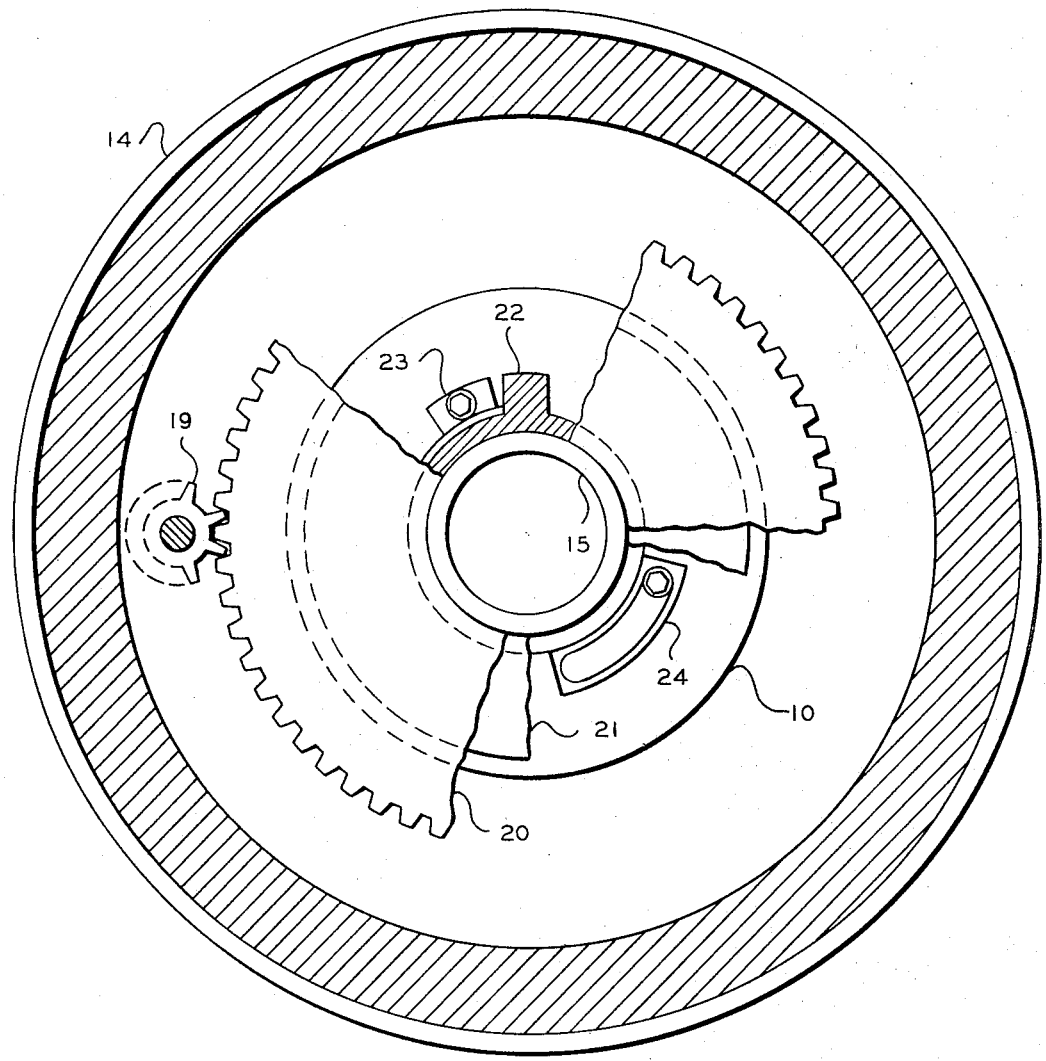
FIGURE 3 is a cross-section taken along line 3—3 of FIGURE 1.

A ring 21, having a lug 22 as shown in FIGURE 3, is attached about the outer diameter of shaft 15 and cooperates with a pair of projections 23 and 24 on the face of a flange on shaft 10 to limit the angular displacement between shafts 10 and 15. The projections are spaced a circumferential distance apart on the face of the flange and act as stops to limit the motion of lug 22 which rides between them. Projection 24 can be slotted and slidably mounted on the face of the flange so that the amount of angular displacement between the shafts can be varied.

A slotted mounting plate 26, shown in FIGURE 2, is attached at one end of shaft 10 external to housing 11 and rotates with shaft 10. The slotted portion or way leads to a control cut-out portion of plate 26, which is provided so that there is no obstruction of the annulus of shaft 15. Plate 26 can be attached by any suitable means such as bolts 27. Spacers 28 are used to off-set plate 26 from the end of shaft 10 and allow for motion of the rigid connecting link 29. A blade holder 31 carries a blade 32 and rides in of plate 26. Connecting link 29 connects blade holder 26 to shaft 15. Link 29 is pivotally attached between two flanges of shaft 15 by bolt 33 or other suitable fastening means. The other end of link 29 is formed with an upraised portion 34 which is pivotally attached to blade holder 31 by pin 35.

As shown in FIGURE 2, shafts 10 and 15 are rotating in the same direction (counterclockwise) at substantially the same speed and lug 22 is riding up against stop projection 23 (FIGURE 3), the connecting link holds the blade holder in an up position. By slowing down or speeding up the rotation of either shaft so that there is angular displacement between the shafts, lug 22 rides back against projection 24 and the connecting link is pivoted inward, sliding the blade holder and blades in the ways of plate 26 toward the axis of rotation and cutting the article passing through the annulus of shaft 15.

In operation of the illustrated apparatus, an elongated article, such as plastic tubing, is fed through the annulus of shaft 15 at a predetermined rate with both shafts rotating at the same speed. At predetermined intervals, depending upon the rate of movement of the article and the length into which it is desired to cut the article, the air flow to air motor 17 is increased, thereby increasing the rotational speed of shaft 15, causing connecting link 29 to pull blade holder 31 downward in the ways of mounting 26. Shaft 10 is rotating so that, as blade 32 contacts and cuts into the article, it is drawn about the periphery of the article, either scoring it or cutting it through. Upon completion of the cut, the air pressure to air motor is increased to a value which rotates shaft 15 at the same speed as shaft 10, carrying the cutting means outwardly from the axis of the shafts. When plastic pipe is to be cut, stop 24 is adjusted to limit the angular displacement between the shafts so that blade 32 cuts through the thickness of the pipe, and shaft 10 is rotated rapidly so that binding of the moving pipe against the blade is minimized.

Binding occurs if the apparatus is mounted stationary to the moving article. Also the stationary mounting results in a conical or spiral cut. If it is desired to obtain a square cut, the apparatus can be mounted for reciprocal motion along the longitudinal axis of the article so that the apparatus moves at the same speed and in the same direction as the article when cutting, then returns to its starting position before beginning another cut. This, of course, also eliminates any binding problems.

Reasonable modification and variation are within the scope of the invention which sets forth a novel cutting apparatus.

That which is claimed is:

1. A cutting apparatus comprising:
   a frame;
   a first outer annular shaft rotatably mounted on said frame;
   a second annular shaft rotatably mounted within the annulus of said first shaft, said second shaft having inner dimensions allowing the passage of an elongated article through said second shaft;
   first driving means operatively connected to said first shaft to rotate said first shaft about its longitudinal axis;
   second driving means operatively connected to said second shaft to rotate said second shaft about its longitudinal axis;
   said first and second driving means being mounted eccentric to the annulus of said second shaft, at least one of said driving means being capable of rotating its respective shaft at variable speed;
   cutting means slidably mounted at and spaced apart from one end of said first shaft for reciprocating movement with respect to the axis of said first shaft; and
   a rigid connecting link pivotally attached to the end of said second shaft proximate to said cutting means, extending between the end of said first shaft and said cutting means, and pivotally attached to said cutting means inwardly toward the longitudinal axis of said shafts.

2. The apparatus of claim 1 wherein said first driving means comprises a belt driven pulley attached to the outer diameter of said first shaft.

3. The apparatus of claim 1 wherein said second driving means comprises:
   an air motor having a driving gear; and
   a gear about the end of said second shaft opposite said connecting link, meshing with said driving gear.

4. The apparatus of claim 1 wherein said cutting means comprises:
   a mounting plate having a way leading to a central cutout portion and attached to one end of said first shaft;
   a blade holder slidably mounted and riding in said way and attached to said connecting link; and
   a blade mounted in said blade holder.

5. The apparatus of claim 1 wherein said first shaft is flanged, including means to limit the angular displacement between said first shaft and said second shaft comprising:
   a pair of projections spaced a circumferential distance apart on the face of said flange; and
   a ring having a projecting lug attached about the outer diameter of said second shaft, said projecting lug riding in the space between said pair of projections.

6. The apparatus of claim 5 wherein at least one of said projections is adjustably mounted on the face of said flange, so as to vary the circumferential distance between said projections.

References Cited

UNITED STATES PATENTS 3,165,034   1/1965   Cvacho _____ 82—53.1

HARRISON L. HINSON, *Primary Examiner.*